United States Patent [19]

Kato et al.

[11] Patent Number: 5,079,969
[45] Date of Patent: Jan. 14, 1992

[54] MOTOR VEHICLE TRANSMISSION SYSTEM

[75] Inventors: Kentaro Kato; Kazuhito Ito; Toshimitsu Takaishi; Kouji Kuroda, all of Saitama, Japan

[73] Assignee: Honda Giken Kogyo Kabushiki Kaisha, Tokyo, Japan

[21] Appl. No.: 602,370

[22] Filed: Oct. 23, 1990

[30] Foreign Application Priority Data

Oct. 23, 1989 [JP] Japan ................. 1-275489

[51] Int. Cl.⁵ .............................................. B60K 41/10
[52] U.S. Cl. ............................................ 74/858; 74/859
[58] Field of Search ............................ 74/858, 859

[56] References Cited

U.S. PATENT DOCUMENTS

| | | | |
|---|---|---|---|
| 4,226,141 | 10/1980 | Espenschied | 74/858 |
| 4,270,414 | 6/1981 | Tellert | 74/852 |
| 4,493,228 | 1/1985 | Vukovich et al. | 74/858 |
| 4,593,580 | 6/1986 | Schulze | 74/859 X |
| 4,677,880 | 7/1987 | Hattori et al. | 74/858 X |
| 4,732,246 | 3/1988 | Tateno et al. | 74/858 X |
| 4,825,831 | 5/1989 | Kawai | 74/858 X |

FOREIGN PATENT DOCUMENTS 2151727A  7/1985  United Kingdom .

*Primary Examiner*—Dirk Wright
*Attorney, Agent, or Firm*—Irving M. Weiner; Joseph P. Carrier; Pamela S. Burt

[57] ABSTRACT

A motor vehicle transmission system, for use on a motorcycle, for example, includes a sensor for detecting a direction in which a shift pedal is operated for an upshift or a downshift, a torque direction sensor for detecting a direction in which the torque is transmitted between an engine and a drive wheel, and an engine output power control assembly responsive to output signals from the sensors for temporarily increasing or reducing the output power of the engine, so that a transmission mechanism can be shifted without disengagement of a clutch.

11 Claims, 2 Drawing Sheets

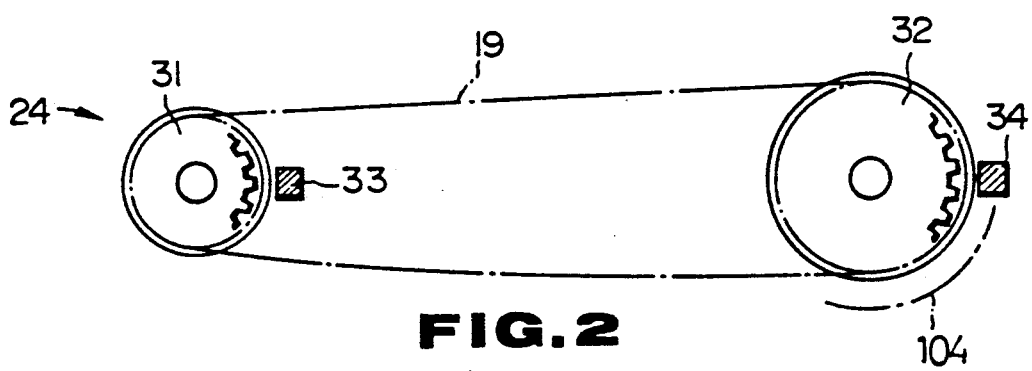
FIG. 2
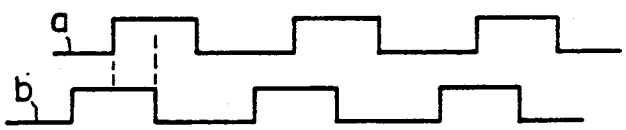
FIG. 3A
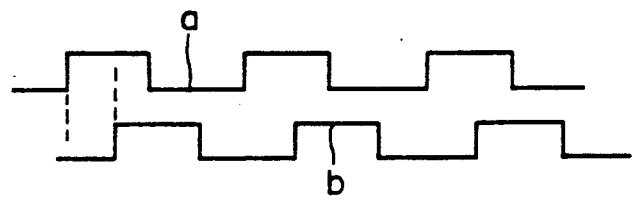
FIG. 3B
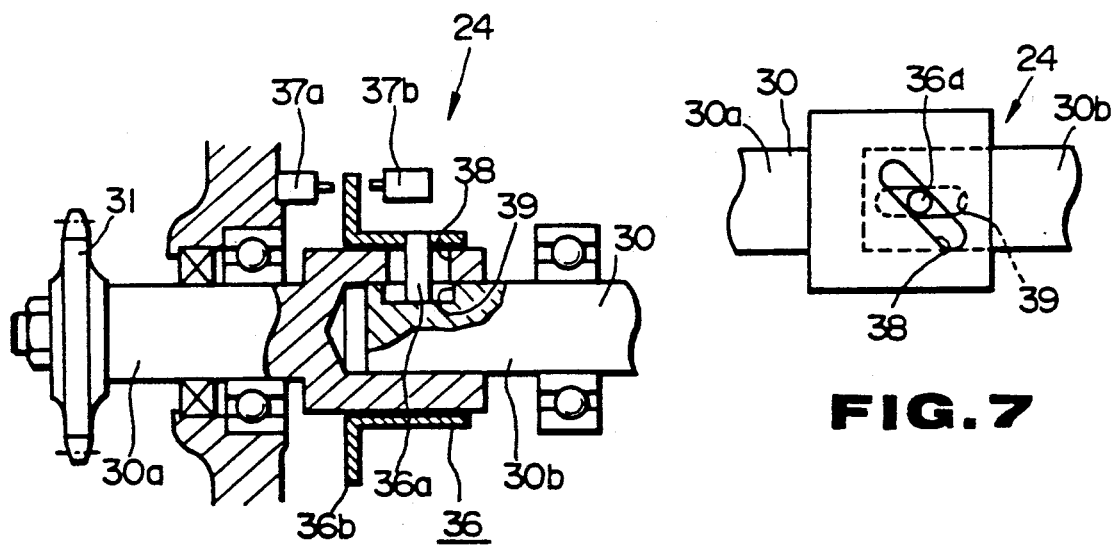
FIG. 6
FIG. 7

MOTOR VEHICLE TRANSMISSION SYSTEM

BACKGROUND OF THE INVENTION

1. Field of the Invention

The present invention relates to a motor vehicle transmission system, and more particularly to a transmission system for use on a motorcycle or the like.

2. Description of the Relevant Art

Transmissions on some motor vehicles such as motorcycles have many gear positions. The driver of such a motor vehicle is therefore required to effect gear shifting frequently while at the same time operating the clutch and the accelerator when the motor vehicle is being driven.

One known transmission system for facilitating gear shifting is disclosed in U.S. Pat. No. 4,270,414. The disclosed transmission system has a gear shifting device which includes electric contacts that can be opened and closed by gear shifting operation. When the gear shifting device is in operation, the contacts are opened to inactivate an ignition circuit for an engine, so that the output power of the engine is reduced temporarily, e.g., for 0.1 through 0.2 second.

According to the disclosed transmission system, however, the output power of the engine is temporarily reduced irrespective of whether the transmission gears are shifted up or down. While the torque is being transmitted from the drive wheels to the engine such as when the motor vehicle is braked by an engine brake, the torque transmitted by the transmission mechanism is not reduced. Therefore, when the clutch is engaged again after the gear shift, the rotation of the output shaft of the engine may not be well synchronized with the rotation of the input shaft of the transmission mechanism, which corresponds to the rotation of the drive wheels. As a result, when the clutch is to be engaged again, it is necessary to engage the clutch gradually for smooth engagement.

The present invention has been made in an effort to effectively solve the problems of the conventional motor vehicle transmission system.

SUMMARY OF THE INVENTION

It is an object of the present invention to provide a motor vehicle transmission system which allows gear shifting to be effected easily and quickly irrespective of whether the gear shifting is an upshift or downshift, and which achieves reliable synchronization between the rotation of the output shaft of an engine and the rotation of the input shaft of a transmission during the gear shifting of the transmission.

According to the present invention, there is provided a motor vehicle transmission system for transmitting output power of an engine variably in speed to a drive wheel in response to operation of a shift control member, comprising shift detecting means for detecting operation of the shift control member, shift direction determining means for determining whether the operation of the shift control member indicates an upshift or a downshift, torque direction determining means for determining a direction in which the torque is transmitted between the engine and the drive wheel, and output power reducing means responsive to output signals from the shift detecting means, the shift direction determining means, and the torque direction determining means, for temporarily reducing the output power of the engine when the operation of the shift control member indicates an upshift and the torque is being transmitted from the engine to the drive wheel.

According to the present invention, there is also provided a motor vehicle transmission system for transmitting output power of an engine variably in speed to a drive wheel in response to operation of a shift control member, comprising shift detecting means for detecting operation of the shift control member, shift direction determining means for determining whether the operation of the shift control member indicates an upshift or a downshift, torque direction determining means for determining a direction in which the torque is transmitted between the engine and the drive wheel, and output power increasing means responsive to output signals from the shift detecting means, the shift direction determining means, and the torque direction determining means, for temporarily increasing the output power of the engine when the operation of the shift control member indicates a downshift and the torque is being transmitted from the wheel to the engine.

According to the present invention, there is further provided a motor vehicle transmission system for transmitting output power of an engine variably in speed to a drive wheel in response to operation of a shift control member, comprising shift detecting means for detecting operation of the shift control member, shift direction determining means for determining whether the operation of the shift control member indicates an upshift or a downshift, torque direction determining means for determining a direction in which the torque is transmitted between the engine and the drive wheel, output power reducing means responsive to output signals from the shift detecting means, the shift direction determining means, and the torque direction determining means, for temporarily reducing the output power of the engine when the operation of the shift control member indicates an upshift and the torque is transmitted from the engine to the drive wheel, and output power increasing means responsive to output signals from the shift detecting means, the shift direction determining means, and the torque direction determining means, for temporarily increasing the output power of the engine when the operation of the shift control member indicates a downshift and the torque is transmitted from the wheel to the engine.

The above and further objects, details and advantages of the present invention will become apparent from the following detailed description of preferred embodiments thereof, when read in conjunction with the accompanying drawings.

BRIEF DESCRIPTION OF THE DRAWINGS

FIG. 2 is a schematic view of a torque direction sensor according to a first embodiment of the present invention;

FIGS. 3A and 3B are diagrams showing an output signal of the torque direction sensor shown in FIG. 2;

FIG. 6 is a cross-sectional view of a torque direction sensor according to a third embodiment of the present invention; and FIG. 7 is a plan view of the torque direction sensor shown in FIG. 6.

DETAILED DESCRIPTION OF THE PREFERRED EMBODIMENTS

Figure 1:
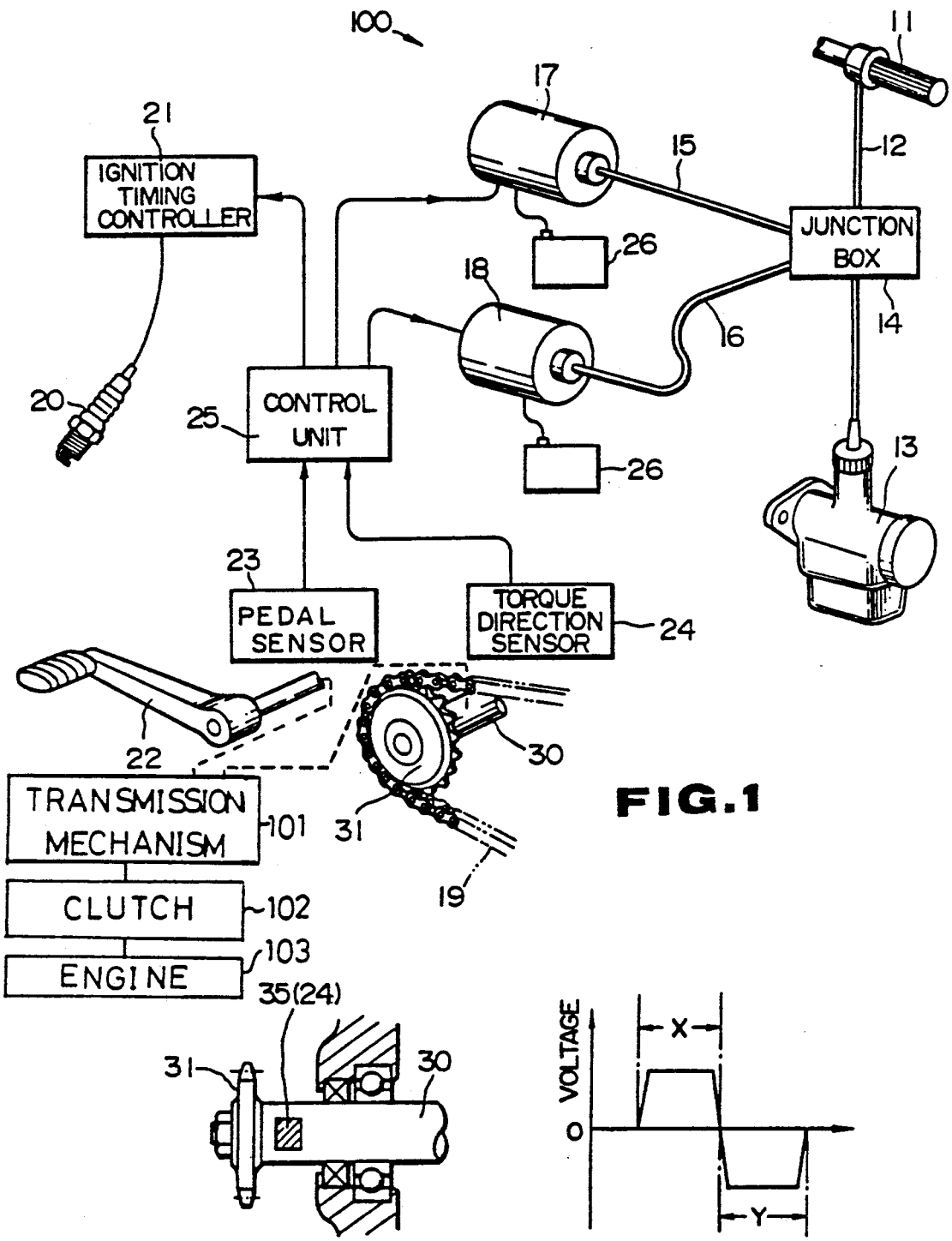
FIG. 1 is a schematic view, partly in block form, of a motor vehicle transmission system according to a preferred embodiment.

FIG. 1 shows a motorcycle transmission system, generally denoted at 100, according to a preferred embodiment of the present invention. The motorcycle transmission system 100 has a known transmission mechanism 101 which is operatively coupled through a clutch mechanism 102 to an internal combustion engine 103, the clutch mechanism 102 being associated with a manual clutch lever that is manually operable when the motorcycle with the transmission system 100 is to be started.

A throttle grip 11 on the handlebar of the motorcycle is operatively coupled to a carburetor 13 of the engine 103 through a cable 12. The cable 12 is connected, in a junction box 14, to cables 15, 16 that are coupled to first and second electromagnetic actuators 17, 18, respectively. The carburetor 13 has a throttle valve (not shown) which controls the rate at which intake air is supplied to the combustion chamber of the engine. The throttle valve is connected to the cable 12 so that it can be opened and closed under the control of the throttle grip 11 and the actuators 17, 18, which are electrically connected to a battery 26.

The first and second actuators 17, 18 are actuated by drive signals supplied from a control unit 25 (described later on). When the first actuator 17 is actuated, it reduces the opening of the throttle valve in the carburetor through a predetermined angle from whatever opening it may have at the time. Conversely, when the second actuator 18 is actuated, it increases the opening of the throttle valve in the carburetor 13 through a predetermined angle from whatever opening it may have at the time.

The engine 103, the clutch 102, and the transmission mechanism 101 are actually combined in an integral structure. The engine has an ignition spark plug 20 electrically connected to an ignition timing controller 21 which controls the ignition timing of the ignition spark plug 20. The ignition timing controller 21 is electrically joined to the control unit 25, for controlling the ignition timing of the ignition spark plug 20 based on a command signal from the control unit 25. The transmission mechanism 101 has an output shaft 30 on which a drive sprocket 31 is fixedly mounted. An endless chain 19 is trained around the drive sprocket 31 and a driven sprocket 32 (FIG. 2) which is fixedly mounted on the hub of a drive wheel 104 of the motorcycle. Therefore, the output shaft 30 of the transmission mechanism 101 is coupled in power transmitting relation to the drive wheel through the chain 19. The gears of the transmission mechanism 101 can be shifted by a shift pedal 22 which is mechanically connected to the gears of the transmission mechanism 101 in a conventional manner. In this embodiment, when the shift pedal 22 is depressed, the gears are shifted up to a higher gear position, and when the shifted pedal 22 is lifted, the gears are shifted down to a lower gear position.

The shift pedal 22 is associated with a pedal movement sensor 23. The pedal movement sensor 23 comprises a switch for detecting an initial operated condition of the shift pedal 22 which is moved under a force stronger than a predetermined level. The pedal movement sensor 23 is electrically connected to the control unit 25, for applying a detected signal to the control unit 25.

The drive and driven sprockets 31, 32 are associated with a torque direction sensor 24 (FIG. 2). The torque direction sensor 24 comprises a pair of pulsers 33, 34 positioned closely to the drive and driven sprockets 31, 32, respectively. The pulsers 33, 34 are electrically connected to the control unit 25. As shown in FIGS. 3A and 3B, the pulser 33 produces a pulse signal a depending on the rotation of the drive sprocket 31, and the pulser 34 produces a pulse signal b depending on the rotation of the driven sprocket 32, the pulse signals a, b being of the same period. In response to the supplied pulse signals a, b, the control unit 25 determines a direction in which the torque is transmitted between the drive and driven sprockets 31, 32, based on the phase difference (i.e., the time by which one signal leads or lags the other) which is produced between the pulse signals a, b due to the backlash between the sprockets 31, 32 and the chain 19 depending on the direction in which the torque is transmitted. Specifically, while the torque is being transmitted from the engine to the drive wheel, the pulse signal a produced by the pulser 33 leads the pulse signal b produced by the pulser 34 (see FIG. 3A). While the torque is being transmitted from the drive wheel to the engine, the pulse signal b leads the pulse signal a (see FIG. 3B). The control unit 25 determines the direction in which the torque is transmitted, based on the phase difference between the pulse signals a, b.

The control unit 25 may comprise a one-chip microcomputer or the like, and is connected to the sensors 23, 24, the ignition timing controller 21, and the actuators 17, 18, as described above. The control unit 25 determines the direction in which the torque is transmitted, based on the output signal from the torque direction sensor 24, and also determines the direction in which the shift pedal 22 is moved, i.e., the gears are shifted, based on the output signal from the pedal movement sensor 23. Based on the determined directions, the control unit 25 applies an ignition retarding signal to the ignition timing controller 21 if the condition (U) below is satisfied, and applies a drive signal to the actuator 18 when the condition (D) below is satisfied.

Condition (U): The shift pedal 22 is depressed to shift up the gears and the drive power (torque) is transmitted from the engine to the drive wheel, i.e., the transmission mechanism 101 is in a normal driving condition.

Condition (D): The shift pedal 22 is lifted to shift down the gears and the torque is transmitted from the drive wheel to the engine, i.e., the transmission mechanism 101 is in a reversely loaded condition.

The control unit 25 serves, in cooperation with the ignition timing controller 21, the sensors 23, 24, and the actuators 17, 18, as a means for determining the direction in which the transmission gears are shifted, a means for reducing the output power of the engine, and a means for increasing the output power of the engine.

Operation of the transmission system 100 will be described below.

When the shift pedal 22 is depressed to shift up the transmission gears while the drive output power is being transmitted from the engine to the drive wheel, thus meeting the condition (U), an ignition retarding signal is applied from the control unit 25 to the ignition timing controller 21, retarding the ignition timing for the ignition spark plug 20. Therefore, the output torque of the engine is reduced temporarily, e.g., for 0.1 through 0.2 second, so that the torque transmitted by the transmission mechanism 101 is reduced substantially to zero, resulting in a condition equivalent to a clutch disengaged condition. At the time the torque transmitted by the transmission mechanism 101 is reduced to zero, the transmission mechanism is shifted up in response to the continued depression of the shift pedal 22. Accordingly, the transmission mechanism 101 is shifted up without the clutch mechanism 102 being disengaged.

When the shift pedal 22 is lifted to shift down the transmission gears while the transmission mechanism 101 is in a reversely loaded condition, thus meeting the condition (D), a drive signal is applied from the control unit 25 to the actuator 18 which then increases the opening of the throttle valve in the carburetor 13 through a certain angle for a short period of time, e.g., 0.1 through 0.2 second, so that the rotational speed and hence the output power of the engine are temporarily increased. Consequently, the torque transmitted by the transmission mechanism 101 is transiently i.e., linearly, reduced to zero during an initial stage of an increase in the engine rotational speed, resulting in a condition equivalent to a clutch disengaged condition. At the time the torque transmitted by the transmission mechanism 101 is reduced to zero, the transmission mechanism 101 is shifted down in response to the continued lifting of the shift pedal 22. Accordingly, the transmission mechanism 101 is shifted down without the clutch mechanism being disengaged.

The torque direction sensor 24 may comprise a strain gage, mechanical limit switches, an acceleration sensor, or any of various other switches or transducers.

Figures 4, 5:
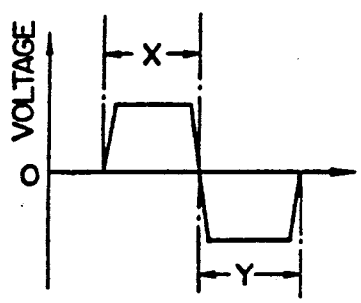
FIG. 4 is a cross-sectional view of a torque direction sensor according to a second embodiment of the present invention.
FIG. 5 is a diagram showing an output signal from the torque direction sensor shown in FIG. 4.

FIG. 4 shows a torque direction sensor according to a second embodiment. The torque direction sensor shown in FIG. 4 is in the form of a strain gage 35 mounted on the output shaft 30 of the transmission mechanism 101, for detecting a torsional strain on the output shaft 30, the strain gage 35 being electrically connected to the control unit 25 (FIG. 1). As shown in FIG. 5, when the torque is transmitted from the engine to the drive wheel (during a range X), the strain gage 35 applies a positive signal to the control unit 25, and when the torque is transmitted from the drive wheel to the engine (during a range Y), the strain gage 35 applies a negative signal to the control unit 25. The control unit 25 determines the direction in which the torque is transmitted based on the sign (positive or negative) of the signal from the strain gage 35. The pedal movement sensor 23 may also be in the form of a strain gage mounted on the rotatable shaft of the shift pedal 22.

According to a third embodiment of the present invention, the torque direction sensor comprises a pair of mechanical limit switches 37a, 37b as shown in FIGS. 6 and 7. The output shaft 30 of the transmission mechanism 101 comprises a pair of interfitting coaxial shaft members 30a, 30b which are angularly movable circumferentially through a predetermined angle about their common axis. A sleeve 36 is slidably fitted over the shaft member 30a. The sleeve 36 supports a radially inwardly extending pin 36a fixed thereto and has a switch trigger 36b in the form of a disc-shaped flange on one end of the sleeve 36. The limit switches 37a, 7b are positioned radially outwardly of the sleeve 36 and one on each side of the trigger 36b. The pin 36a extends through a substantially helical slot 38 defined in the shaft member 30a and engaging in an axial slot 39 defined in the other shaft member 30b. When the shaft members 30a, 30b rotate relatively to each other in a direction depending on the direction in which the torque is transmitted, the pin 36a is axially moved and so is the sleeve 36 which is integral with the pin 36a. The trigger 36b of the sleeve 36 is brought into engagement with either one of the limit switches 37a, 37b, which is actuated to send a signal to the control unit 25 (FIG. 1). Based on the signal from the limit switch 37a or 37a, the control unit 25 determines the direction in which the torque is transmitted.

The torque direction sensor may comprise an acceleration sensor. In such an embodiment, the acceleration or deceleration of the motorcycle is its longitudinal direction is detected by the acceleration sensor which is connected to the control unit 25. When the acceleration sensor detects an acceleration of the motorcycle, then the control unit 25 determines that the torque is transmitted from the engine to the drive wheel. When the acceleration sensor detects a deceleration of the motorcycle, then the control unit 25 determines that the torque is transmitted from the drive wheel to the engine.

In the above illustrated embodiment, the actuator 17 is not brought into operation, but rather output power of the engine is controlled through the ignition timing controller 21 and the actuator 18. However, the actuator 17 may be actuated to temporarily reduce the output power of the engine, instead of relying on the ignition timing controller 21, under a predetermined condition. More specifically, when the condition (U) is satisfied, the control unit 25 applies a drive signal to the actuator 17 to reduce the opening of the throttle valve in the carburetor 13 temporarily through a given angle. Therefore, the output torque of the engine is temporarily or instantaneously reduced. The torque transmitted by the transmission mechanism 101 is reduced substantially to zero, resulting in a condition equivalent to a clutch disengaged condition. At this time, the transmission mechanism 101 is shifted up in response to the depression of the shift pedal 22 without the driver's operating the clutch lever.

The motorcycle transmission system 100 allows the gears of the transmission mechanism 101 to be shifted without disengagement of the clutch irrespective of whether the shift pedal 22 is depressed for an upshift or lift for a downshift. When the condition (U) is satisfied, i.e., the transmission mechanism 101 is shifted up, the output power of the engine is temporarily reduced, and when the condition (D) is satisfied, i.e., the transmission mechanism 101 is shifted down, the output power of the engine is temporarily increased. Therefore, after the transmission mechanism 101 has been shifted, the rotation of the output shaft of the engine and the rotation of the input shaft of the transmission mechanism 101 are reliably well synchronized with each other. Consequently, irrespective of the direction in which the transmission mechanism 101 is shifted, the transmission mechanism 101 can be shifted easily and quickly, and the rotation of the output shaft of the engine and the rotation of the input shaft of the transmission mechanism 101 are reliably well synchronized with each other.

While the present invention has been described as being incorporated in the motorcycle transmission system, the principles of the invention are also applicable to any of various transmission systems for other motor vehicles such as passenger automobiles.

The means for reducing the output power of the engine may be implemented in various ways, rather than the ignition timing controller which retards the ignition timing for the ignition spark plug and the actuator for reducing the opening of the throttle valve. For example, the energization of the ignition spark plug may be temporarily stopped, the fuel supplied to a fuel injection valve may be temporarily cut off, or the cross-sectional area of an intake or exhaust passage may be temporarily reduced, for reducing the output power of the engine.

The ignition timing controller 21 and the actuators 17, 18 may be replaced with a single actuator actuatable by the control unit 25 for increasing or reducing the opening of the throttle valve from whatever opening it may have at the time.

Since the number of components of the transmission system 100 is not so large, the components or devices 23, 24, 25, 17, 18, 14 may easily be added to an existing transmission system for converting the latter into the transmission system 100 according to the present invention.

Although there have been described what are at present considered to be the preferred embodiments of the present invention, it will be understood that the invention may be embodied in other specific forms without departing from the essential characteristics thereof. The present embodiments are therefore to be considered in all aspects as illustrative, and not restrictive. The scope of the invention is indicated by the appended claims rather than by the foregoing description.

We claim:

1. A motor vehicle transmission system for transmitting output power of an engine variably in speed to a drive wheel in response to operation of a shift control member, comprising:
   shift detecting means for detecting operation of the shift control member;
   shift direction determining means for determining whether the operation of the shift control member indicates an upshift or a downshift;
   torque direction determining means for determining a direction in which the torque is being transmitted between the engine and the drive wheel;
   output power reducing means responsive to output signals from said shift detecting means, said shift direction determining means, and said torque direction determining means, for temporarily reducing the output power of the engine when the operation of the shift control member indicates an upshift and the torque is being transmitted from the engine to the drive wheel;
   said shift control member being mechanically connected to gears of the transmission system; and
   said output power reducing means temporarily and linearly reduces the output power of the engine.

2. A motor vehicle transmission system according to claim 1, wherein said output power reducing means includes means for temporarily retarding ignition timing of the engine when operation of said shift control member indicates a upshift and torque is being transmitted from the engine to the drive wheel.

3. A motor vehicle transmission system for transmitting output power of an engine variably in speed to a drive wheel in response to operation of a shift control member, comprising:
   shift detecting means for detecting operation of the shift control member;
   shift direction determining means for determining whether the operation of the shift control member indicates an upshift or a downshift;
   torque direction determining means for determining a direction in which the torque is being transmitted between the engine and the drive wheel;
   output power increasing means responsive to output signals form said shift detecting means, said shift direction determining means, and said torque direction determining means, for temporarily increasing the output power of the engine when the operation of the shift control member indicates a downshift and the torque is being transmitted from the wheel to the engine;
   said shift control member being mechanically connected to gears of the transmission system;
   and said output power increasing means temporarily and linearly increases power of the engine.

4. A motor vehicle transmission system for transmitting output power of an engine variably in speed to a drive wheel in response to operation of a shift control member, comprising:
   shift detecting means for detecting operation of the shift control member;
   shift direction determining means for determining whether the operation not the shift control member indicates an upshift or downshift;
   torque direction determining means for determining a direction in which the torque is being transmitted between the engine and the drive wheel;
   output power reducing means responsive to output signals from said shift detecting means, said shift direction determining means, and said torque direction determining means, for temporarily reducing the output power of the engine when the operation of the shift control member indicates an upshift and the torque is being transmitted from the engine to drive wheel;
   output power increasing means responsive to output signals from said shift detecting means, said shift direction determining means, and said torque direction determining means, for temporarily increasing the output power of the engine when the operation of the shift control member indicates a downshift and the torque is being transmitted to the wheel to the engine;
   said shift control member being mechanically connected to gears of the transmission system;
   said output power reducing means temporarily and linearly reduces the output power of the engine; and
   said output power increasing means temporarily and linearly increases the output power of the engine.

5. A motor vehicle transmission system comprising:
   an engine;
   a drive wheel;
   a transmission mechanism operatively coupled between said engine and said drive wheel, for transmitting output power of the engine variably in speed to the drive wheel, said transmission mechanism having a shift control member and an input shaft, and being associated with a clutch;
   shift direction detecting means for detecting a direction in which said shift control member is operated;
   torque direction detecting means for detecting a direction in which torque is being transmitted between the engine and the drive wheel by said transmission mechanism;

output power varying means for varying the output power of said engine;

control means operatively connected to said shift direction detecting means, said torque direction detecting means, and said output power varying means, and responsive to detected signals from said shift direction detecting means and said torque direction detecting means, for actuating said output power varying means to vary the output power of said engine when the transmission mechanism is being shifted by said shift control member, thereby synchronizing rotation of said engine with rotation of the input shaft of said transmission mechanism, said rotation of said input shaft corresponding to rotation of said drive wheel, whereby said transmission mechanism can be shifted from one gear to another in a single motion without operating said clutch;

said shift control member being mechanically connected to gears of the transmission system; and said output power varying means temporarily and linearly varies the output power of the engine.

6. A motor vehicle transmission system according to claim 5, wherein said shift control means temporarily reduces the output power of the engine when the operation of the shift control member indicates an upshift and the torque is being transmitted from the engine to the drive wheel, and for temporarily increasing the output power of the engine when the operation of the shift control member indicates a downshift and the torque is being transmitted from the wheel to the engine.

7. A motor vehicle transmission system comprising:
a transmission mechanism operatively coupled between an engine output shaft and a drive wheel, and including a shift control member and an input shaft, and being associated with a clutch;

first sensing means for detecting a direction in which said shift control member is operated;

second sensing means for detecting a direction in which torque is being transmitted between the engine and the drive wheel by said transmission mechanism;

means for temporarily varying output power of the engine based on detected signals from said first sensing means and said second sensing means when said transmission mechanism is being shifted by said shift control member for thereby synchronizing rotation of said engine output shaft with rotation of said input shaft of said transmission, whereby said transmission mechanism can be shifted from one gear to another in a single motion without operating said clutch;

said shift control member being mechanically connected to gears of the transmission system; and said output power varying means temporarily and linearly varies the output power of the engine.

8. A motor vehicle transmission system according to claim 7, wherein said output power varying means comprises means for temporarily reducing the output power of the engine when the operation of the shift control member indicates an upshift and torque is being transmitted from the engine to the drive wheel, and for temporarily increasing the output power of the engine when the operation of the shift control member indicates a downshift and torque is being transmitted from the wheel to the engine.

9. A motor vehicle transmission system according to claim 7, wherein said transmission mechanism includes a drive sprocket and a driven sprocket, and said second sensing means comprises a pair of pulsers associated with said drive sprocket and driven sprocket, respectively, for producing pulse signals based on rotation of said drive sprocket and said driven sprocket, respectively.

10. A motor vehicle transmission system according to claim 7, wherein said transmission mechanism further includes an output shaft and said second sensing means comprises a strange gage mounted on said transmission output shaft for detecting torsional strain on said output shaft.

11. A motor vehicle transmission system accordingly to claim 7, wherein said transmission mechanism further includes an output shaft, said transmission output shaft comprises a pair of interfitting coaxial shaft members which are angularly movable circumferentially through a predetermined angle about their common axis, and said second sensing means comprises means for determining a direction in which said interfitting coaxial shaft members are angularly moved relative to each other.

* * * * *